(12) United States Patent
Blake et al.

(10) Patent No.: US 6,282,959 B1
(45) Date of Patent: *Sep. 4, 2001

(54) COMPENSATION OF SECOND-ORDER NON-LINEARITY IN SENSORS EMPLOYING DOUBLE-ENDED TUNING FORKS

(75) Inventors: Graeme A. Blake, Bellevue; Paul H. Collins; Steven A. Foote, both of Issaquah; Ronald B. Leonardson, Redmond, all of WA (US)

(73) Assignee: AlliedSignal, Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/873,048

(22) Filed: Jun. 11, 1997

Related U.S. Application Data

(60) Provisional application No. 60/019,566, filed on Jun. 11, 1996.

(51) Int. Cl.⁷ .............................. G01P 9/04; G01P 15/10
(52) U.S. Cl. .................................. 73/504.16; 73/514.29; 73/514.38
(58) Field of Search .......................... 310/321; 702/141; 73/504.03, 504.12, 504.16, 510, 514.29, 514.33, 514.34, 514.38

(56) References Cited

U.S. PATENT DOCUMENTS 5,594,170  1/1997  Peters ................................. 73/514.29

Primary Examiner—Helen C. Kwok

(57) ABSTRACT

A method for designing a sensor using a dual double-ended tuning forks which provides composite cancellation of second-order non-linearity terms.

18 Claims, 6 Drawing Sheets

COMPENSATION OF SECOND-ORDER NON-LINEARITY IN SENSORS EMPLOYING DOUBLE-ENDED TUNING FORKS

This application claims the benefit of U.S. Provisional Application Serial No. 60/019,566 filed Jun. 11, 1996.

BACKGROUND OF THE INVENTION

The invention relates to double-ended tuning forks and particularly to double-ended tuning forks as used in the construction of accelerometer devices.

Non-linearities in accelerometer outputs can lead to significant measurement errors in the absence of compensation circuitry. Generally, non-linearity errors occur when inputs are near the full-scale range of the instrument or there is vibration along the input axis, but they may also occur simply because the particular application requires an extremely linear response. Instruments using double-ended tuning forks, or DETFs, as inertial reaction force sensors are particularly vulnerable to errors introduced by non-linearities. The inherent non-linearity of a force sensor or accelerometer using a single DETF is typically higher than that of a common high-accuracy, analog, force-rebalance accelerometer, for example, those described in U.S. Pat. Nos. 3,702,073 and 4,250,757.

A DETF-based accelerometer, however, possesses real advantages over other accelerometers. For example, a DETF-based accelerometer typically provides smaller size, lower power consumption, and ease of interface to digital systems. Compensation of DETF-based accelerometer non-linearity provides all these benefits without a serious performance penalty.

Practical accelerometers in the past have used software compensation of non-linearities, or a combination of software and hardware compensation.

Software compensation is not viable for other than constant or slowly varying acceleration inputs because the processor cannot execute the compensation commands at frequencies high enough to keep pace with the accelerometer inputs.

One combined software and hardware compensation approach that has been used is to infer the input acceleration based on models that depend on the difference frequency between two DETFs. This approach assumes that the DETFs have been designed to possess the same second-order non-linearity when subjected to purely axial forces.

The DETFs may be attached either to one or to two independent proof masses. Dual-proof-mass accelerometers are really two separate accelerometers in the same package. Using dual-proof-mass accelerometers leads to difficult matching problems to ensure that the responses of the two accelerometers track when the accelerometer sees vibration or other rapidly-changing inputs.

A common approach to avoiding the common mode tracking problems created by using two accelerometers in one package is to attach two DETFs to a single proof mass, arranging them so that displacement of the proof mass under loading places one of them in tension and the other in compression. In practical accelerometers, the exact arrangement of the DETFs is dictated by several factors. One factor is the need to incorporate stress isolation, for example, see U.S. Pat. No. 4,766,768, incorporated herein by reference. Another factor is the necessity of having both DETFs on the same side of the proof mass, for example, monolithic silicon accelerometers built with epitaxial layer DETFs. Other reasons which do not consider the effect of the DETF positions on the non-linearity of the accelerometer also dictate the exact arrangement of the DETFs, for example, manufacturing tolerances or other processing limitations, or size restrictions.

FIG. 1 shows a plan view of a DETF accelerometer constructed according to the prior art techniques. The accelerometer of FIG. 1 combines a proof mass 2 and DETFs 4, 6. DETFs 4, 6, however, are positioned at much different distances 14, 16 from the centerline 8 of the hinges 10, 12. Thus, the non-linearities of the two DETFs do not cancel effectively when the difference frequency is formed, even when the DETFs are designed for the ideal case in which second-order non-linearity, $K_2$, values cancel when subjected to purely axial forces. The lack of second-order non-linearity cancellation when the difference frequency is formed causes measurement errors and raises difficulties when DETF force sensors and accelerometers are used in applications requiring a high degree of linearity.

General information on the design of vibrating beam accelerometers may be found in the text by Lawrence entitled *Modern Inertial Technology: Navigation, Guidance and Control*, Copyright 1993, Springer-Verlag, New York.

SUMMARY OF THE INVENTION

The invention recognizes and accounts for the fact that the deformation of the DETFs in a two-DETF, single-proof-mass accelerometer are not purely axial extensions or compressions, but also involve rotations and transverse displacements of the ends of the DETFs. The rotations and displacements create additional changes in the tine stiffnesses beyond those that occur due to simple stress stiffening effects. The effect of the additional stiffness changes is to alter the linearities of the DETFs, so that the second-order effects such as those due to, for example, Euler buckling loads, do not cancel when the difference frequency is formed.

According to one aspect of the present invention, the present invention includes various embodiments which overcome the problems of the prior art by providing positioning of the two DETFs which minimizes or eliminates second-order, $K_2$, non-linearity effects.

According to another aspect of the present invention, the invention provides methods for positioning the dual-DETFs such that second-order non-linearities of the two DETFs will be equal under the deformations that they actually undergo in use. Thus, the present invention provides cancellation of the composite second-order non-linearity.

According to yet another aspect of the present invention, the present invention provides single processing etching mask change to fine tune the position of the two DETFs which minimizes both individual DETF second-order non-linearity and the composite common mode second-order non-linearity.

According to still another aspect of the present invention, the present invention further provides various physical embodiments which place the two DETFs such that the individual DETF second-order values are a minimum and the composite second-order terms cancel.

DETAILED DESCRIPTION OF THE PREFERRED EMBODIMENTS

Figure 1:
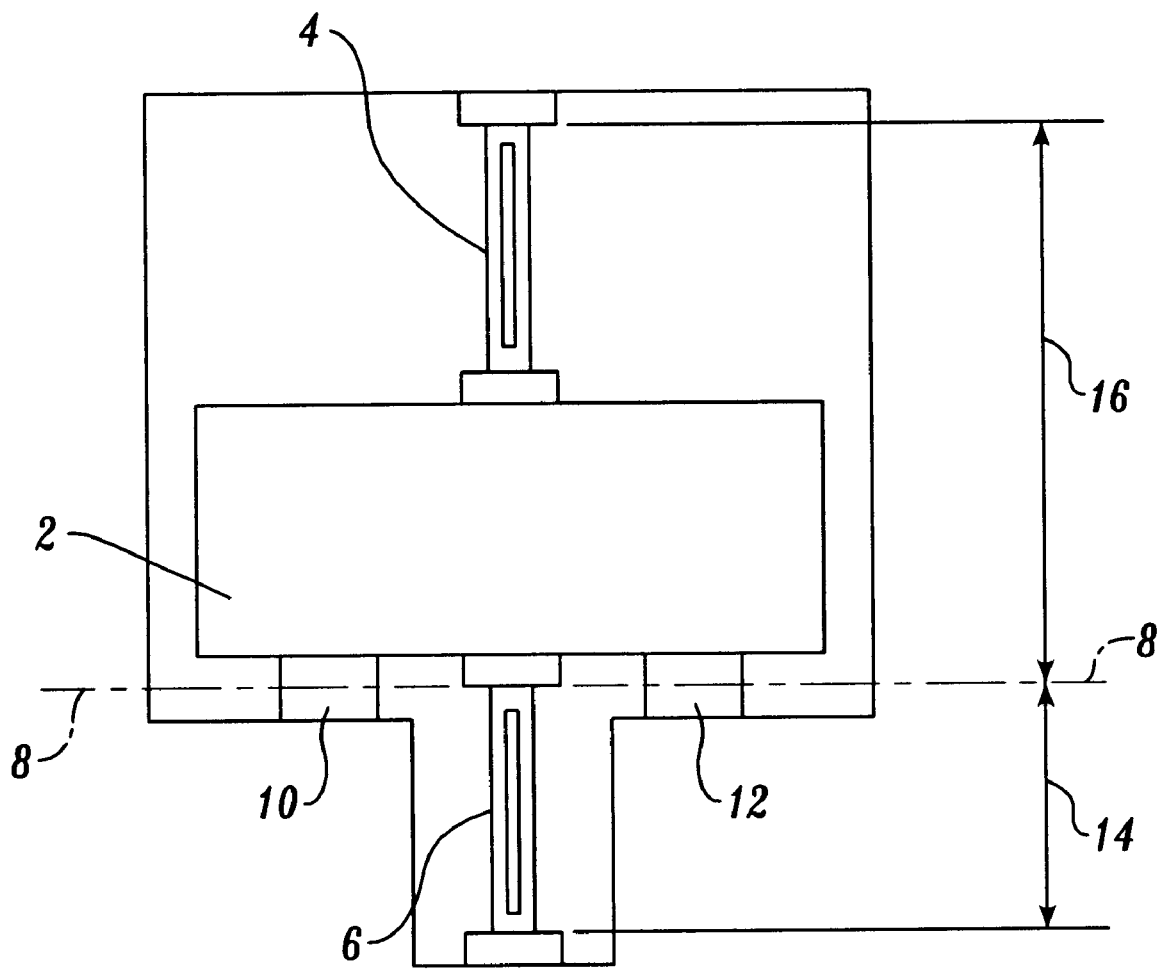
FIG. 1 is a plan view of a double-ended tuning fork device according to the prior art.

The mounting positions of the two DETFs on the proof mass and on the outer support structure directly affect second-order non-linearity performance and have resulted in design compromises in the prior art. The present invention provides various embodiments which overcome the problems of the prior art by providing positioning of the two DETFs which minimizes or eliminates second-order, $K_2$, non-linearity effects. The present invention is effective in both high-g force operation in excess of 100 g's and in high vibration environments as well as in lower force and vibration ranges.

The present invention is realized in geometry features; thus, no external environment will null-out or degrade sensor performance. In other words, there is no theoretical limit on the range of g-force input or vibration environment in which the invention may operate. Any practical limits on the operational g-force range or vibrational environment result from limitations in manufacturing processes used to practice the invention. The present invention provides the overall product goals of excellent performance and low unit cost.

Various embodiments of the present invention are disclosed. The preferred geometry to be used is dictated by the specific design constraints of a particular application. The present invention provides a method for determining the preferred DETF mounting configuration and determining the fine adjustment of the final DETF positioning to achieve the desired composite sensor performance while realizing low unit cost.

There are many ways of expressing the non-linearities of the DETFs which are known to those of skill in the art. The general equations describing DETF performance follow and the terms and coefficients used herein are defined. Although the calculation of non-linearities can be carried out to an infinite degree or order, typical practical accelerometer applications carry out the calculations only to the third order because of the diminishing effect of higher order non-linearities on DETF performance. All of the many ways of expressing the third-order non-linearities start with a formula associating DETF frequencies, F, with input acceleration, g. The output frequencies of the two DETFs, $F_1$ and $F_2$, are given as:

$$F_1 = \sum_{n=0}^{3} a_n * g^n \text{ and } F_2 = \sum_{n=0}^{3} b_n * g^n \quad \text{Eqs. (1 and 2)}$$

where: $a_n$ and $b_n$ are constants; and $g^n$=actual input acceleration raised to the nth power.

Thus, the output frequencies of the two DETFS, $F_1$ and $F_2$, at the input acceleration, g, for n=0, 1, 2, and 3 are given as:

$$F_1 = a_0 + (a_1*g) + (a_2*g^2) + (a_3*g^3) \quad \text{Eq(3)}$$

$$F_2 = b_0 + [b_1*(-g)] + [b_2*(-g^2)] + [b_3*(-g^3)] \quad \text{Eq(4)}$$

where: $F_1$ is the output frequency of the first DETF;

$F_2$ is the output frequency of the second DETF;

g is the actual g-force input sensed by the accelerometer; and $a_0 \ldots a_3$ and $b_0 \ldots b_3$ are constants:

$a_0$, $b_0$ are bias;

$a_1$, $b_1$ are scale factor;

$a_2$, $b_2$ are second-order non-linearity; and $a_3$, $b_3$ are third-order non-linearity.

Thus, cancellation is given by:

$$F_1 - F_2 \quad \text{Eq.(5)}$$

which expands to:

$$F_1 - F_2 = \frac{\begin{array}{l} a_0 + (a_1*g) + (a_2*g^2) + (a_3*g^3) - \\ \{b_0 + [b_1*(-g)] + [b_2*(-g^2)] + [b_3*(-g^3)]\} \end{array}}{\begin{array}{l}[a_0 - b_0] + [(a_1+b_1)*g] + \\ [(a_2-b_2)*g^2] + [(a_3+b_3)*g^3]\end{array}} \quad \text{Eq (6)}$$

Note: Since the two DETFs flex in opposite directions for any given input to the sensor the sign of the input acceleration, g, of equation (4) is opposite that of equation (3).

The general form of all the expansions for the indicated g-level, G, is:

$$G = K_0 + K_1*g + K_2*g^2 + K_3*g^3 \quad \text{Eq. (7)}$$

where: G is the indicated acceleration or g-level;

$K_0$ is bias;

$K_1$ is scale factor;

$K_2$ is second-order non-linearity;

$K_3$ is third-order non-linearity; and g is the actual acceleration or g input level in g's.

Conversion from the individual output frequencies of the two DETFs, $F_1$ and $F_2$, to the indicated g-levels, $G_1$ and $G_2$, is achieved by dividing equations (3) and (4), above, by $a_1$ and $b_1$, respectively, such that the scale factor coefficients become equal to 1. Thus, DETF frequency, $F_1$, is converted to indicated g-level, $G_1$, in the form of equation (3) according to:

$$G_1 = \frac{F_1}{a_1} = \frac{a_0}{a_1} + \frac{a_1 * g}{a_1} + \frac{a_2 * g^2}{a_1} + \frac{a_3 * g^3}{a_1} \quad \text{Eq. (8)}$$

which can be rewritten in the form of equation (7) as:

$$G_1 = K_{0_1} + 1*g + K_{2_1}*g^2 + K_{3_1}*g^3 \quad \text{Eq.(9)}$$

where: $K_{0_1} \ldots K_{3_1}$ are constants associated with the first DETF and are defined as shown in Table 1.

Similarly, DETF frequency, $F_2$ in the form of equation (7), is converted to indicated g-level, $G_2$, by dividing equation (4) by the constant, $b_1$, to obtain:

$$G_2 = K_{0_2} + 1*g + K_{2_2}*g^2 + K_{3_2}*g^3 \quad \text{Eq.(10)}$$

where: $K_{0_2} \ldots K_{3_2}$ are constants associated with the second DETF and are similarly defined as shown in Table 1.

Conversion from the difference frequencies of the two DETFs, $F_1 - F_2$, to the indicated g-level, G, is achieved by dividing equation (6), above, by the composite scale factor coefficient, $(a_1 + b_1)$. Thus, the difference frequency, $F_1 - F_2$, is converted to indicated g-level, G, in the form of equation (7). Thus, DETF difference frequency, $F_1 - F_2$, is converted to indicated g-level, $G_{DETF}$, in the form of equation (6) according to:

$$\begin{aligned} G_{DETF} &= \frac{F_1 - F_2}{(a_1 + b_1)} \quad \text{Eq (11)} \\ &= \frac{[a_0 - b_0]}{(a_1 + b_1)} + \frac{[(a_1 + b_1)*g]}{(a_1 + b_1)} + \frac{[(a_2 - b_2)*g^2]}{(a_1 + b_1)} + \\ &\quad \frac{[(a_3 + b_3)*g^3]}{(a_1 + b_1)} \end{aligned}$$

which can be rewritten in the form of equation (7) as:

$$G = K_0 + 1*g + K_2*g^2 + K_3*g^3 \quad \text{Eq.(12)}$$

where: $K_0 \ldots K_3$ are constants and are defined as shown in equation (11) and Table 1.

Those of skill in the art will recognize that the actual input level, g, may be estimated from either $F_1$, $F_2$ or $F_1 - F_2$, so long as the appropriate K values are used to form the correct expression for the associated indicated output, $G_1$, $G_2$, or $G_{DETF}$. Table 1 shows the appropriate K values to be used to form the desired expression for the indicated output, $G_1$, $G_2$, or $G_{DETF}$, used to estimated the actual input acceleration, g. However, in most DETF applications, measurement of the input acceleration, g, is based upon the difference frequency, $F_1 - F_2$, and estimated in terms of $G_{DETF}$ using equations (11) and (12).

TABLE 1

| Parameter, Units | $G_1$ Eq. (8) | $G_2$ Eq. (10) | $G_{DETF}$ Eq. (11) |
|---|---|---|---|
| Bias, $K_0$, g | $a_0/a_1$ | $b_0/b_1$ | $\dfrac{(a_0 - b_0)}{(a_1 + b_1)}$ |
| Scale Factor, $K_1$, g/g | 1 | 1 | 1 |
| Second-order non-linearity, $K_2$, g/g² | $a_2/a_1$ | $b_2/b_1$ | $\dfrac{(a_2 - b_2)}{(a_1 + b_1)}$ |
| Third-order non-linearity, $K_3$, g/g³ | $a_2/a_1$ | $b_2/b_1$ | $\dfrac{(a_3 + b_3)}{(a_1 + b_1)}$ |

Ideally, both DETFs are designed such that $a_2 = b_2$ and thus the composite second-order non-linearity term, $$\frac{(a_2 - b_2)}{(a_1 + b_1)},$$

is zero in ideal conditions when only axial loadings exist. In other words, the second-order non-linearity terms of the individual DETFs are designed to exactly cancel when subjected to purely axial forces.

The coefficients in a practical sensor, however, will not exactly match due to design considerations and manufacturing tolerances. Furthermore, in a practical accelerometer, because one end of each of the DETFs is fixed to a solid support structure while the other moves with the proof mass, the two DETFs experience deformations, including rotations and transverse displacements, not accounted for when the DETFs have been designed to have equal second-order non-linearity values when subjected to purely axial forces. Thus, the second and third order non-linearity values, $K_2$ and $K_3$, respectively, will not cancel in a practical accelerometer even when the DETFs are designed to be identical.

Various embodiments of the present invention overcome this lack of composite second-order cancellation by providing positioning of the two DETFs in a practical accelerometer which minimizes or eliminates second-order, $K_2$, non-linearity effects. Other aspects of the present invention provide various physical embodiments which place the two DETFs such that the individual DETF second-order values are a minimum and the composite second-order terms cancel.

The present invention comprises positioning the ends of the DETFs attached to the proof mass, which are the ends that move, such that second-order non-linearities of the two DETFs will be substantially equal, under the deformations that they actually undergo in use, including rotation and transverse displacement. Thus, the second-order non-linearity will be absent from the difference frequency. The accelerometer of the present invention places the ends of the DETFs such that the second-order terms, $a_2$ and $b_2$, cancel or substantially cancel when both axial and transverse forces are considered.

With reference to the general expressions of non-linearity above, the composite second-order term in the difference frequency cancels when the difference in the individual DETF coefficient terms, $a_2 - b_2$, equals zero. Thus, the accelerometer of the present invention places the ends of the DETFs such that $a_2 - b_2$ is equal to zero, or approximately zero.

Figure 2:
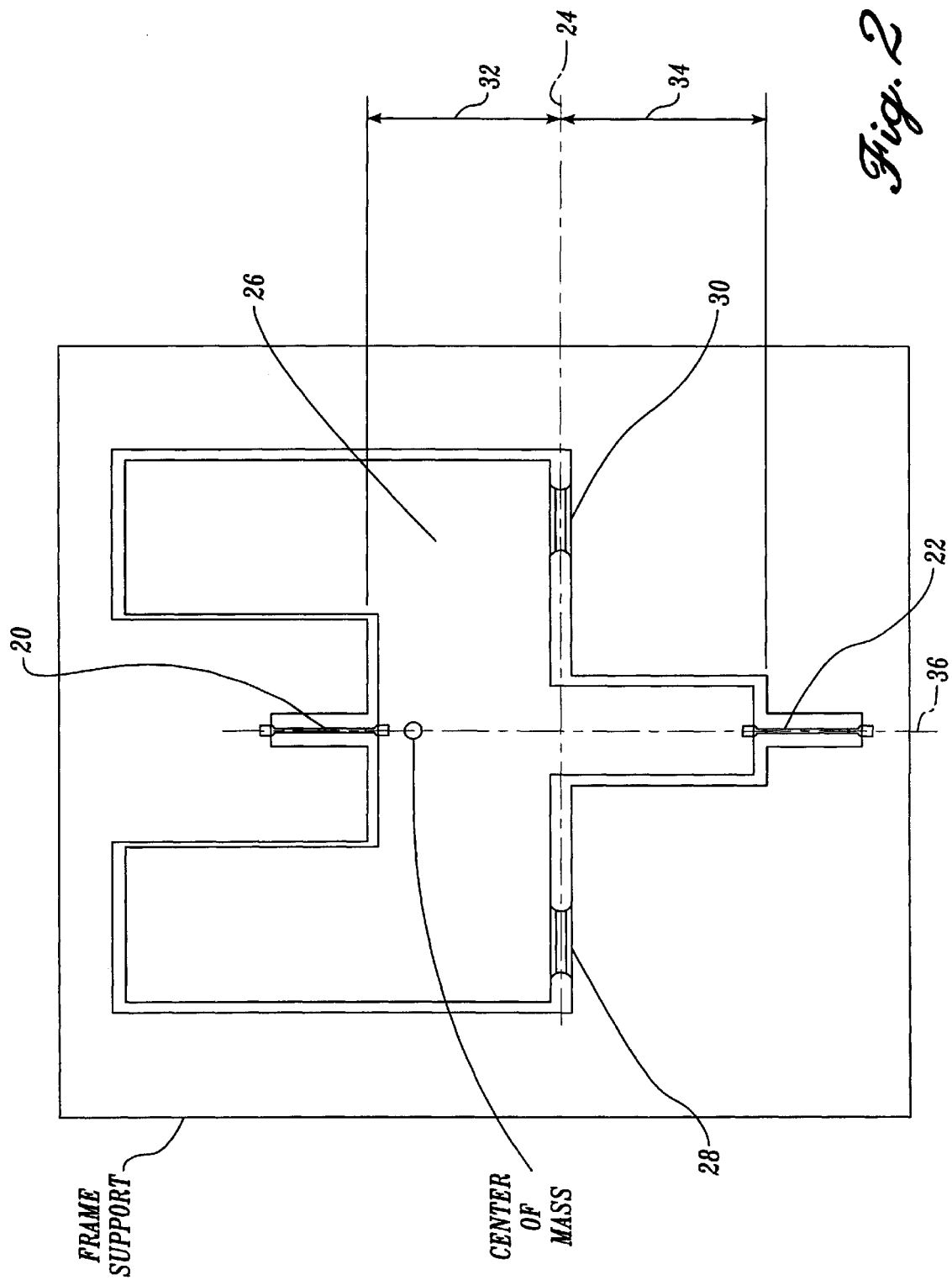
FIG. 2 is a plan view of a double-ended tuning fork device according to an embodiment of the present invention.

FIG. 2 shows a plan view of an accelerometer constructed according to the present invention. FIG. 2 shows a configuration for the case where the two DETFs 20, 22 are the same size and shape and are positioned on opposite sides of the hinge axis 24 of the sensor proof mass 26, where hinge axis 24 is defined by the centerline of flexures 28, 30. According to the present invention, positioning of DETFs 20, 22 such that the numerator, $(a_2-b_2)$, in the second-order non-linearity equation, $$\frac{(a_2 - b_2)}{(a_1 + b_1)},$$

is zero, or approximately zero, is accomplished by having the moving ends of both DETFs 20, 22 at essentially the same distance from hinge axis 24. In other words, in FIG. 2, distance 32 is equal or approximately equal to distance 34.

Positioning DETFs 20, 22 within hinges 28, 30 and close to the centerline 36 of proof mass 26 maintains good common mode characteristics. For example, when DETFs 20, 22 are misaligned with respect to centerline 36, a mechanical moment couple may be formed between DETFs 20, 22 which could limit the common mode tracking performance. Common mode tracking performance, or common mode cancellation, is the tracking and mutual cancellation of the common mode responses of two DETFs in a single sensor when the sensor is subjected to a vibration input or any other rapidly changing input. Such a couple is avoided according to the embodiment of FIG. 2 when DETFs 20, 22 are aligned with centerline 36.

According to the embodiment of the invention shown in FIG. 2, side loading is minimized and good bandwidth is maintained. For example, DETFs 20, 22 operate effectively within a +/-30 percent range of frequency change relative to their nominal no-load operating frequency. DETFs 20, 22 preferably operate within a +/-10 percent range of frequency change. In one example, if the DETFs are designed to operate at a nominal no-load frequency of 100,000 Hz, the change in frequency over the entire operating range of the sensor, from negative full scale input to positive full scale input, is preferably within +/-10 percent of the nominal no-load operating frequency. In the example where the DETFs are designed to operate at a nominal no-load frequency of 100,000 Hz, the DETFs would be designed to operate in the range of 90,000 Hz to 110,000 Hz.

Furthermore, the configuration of FIG. 2 limits unit size and cost while improving performance. The performance improvements and reduced sensitivity to thermal effects and external stresses provided by the present invention reduce sensitivity to manufacturing processes. Thus, lower cost for comparable performance is achieved in a comparable unit size.

The embodiment of FIG. 2 was achieved using the method according to the present invention. The embodiment of FIG. 2 was achieved using an iterative approach to determining the preferred spacing between DETFs 20, 22 at which the $K_2$ value of the difference frequency cancels and the $K_2$ values for individual DETFs 20, 22 are minimized for a given set of design constraints for a particular application through a sequence of calculations discussed in detail below.

Figure 3:
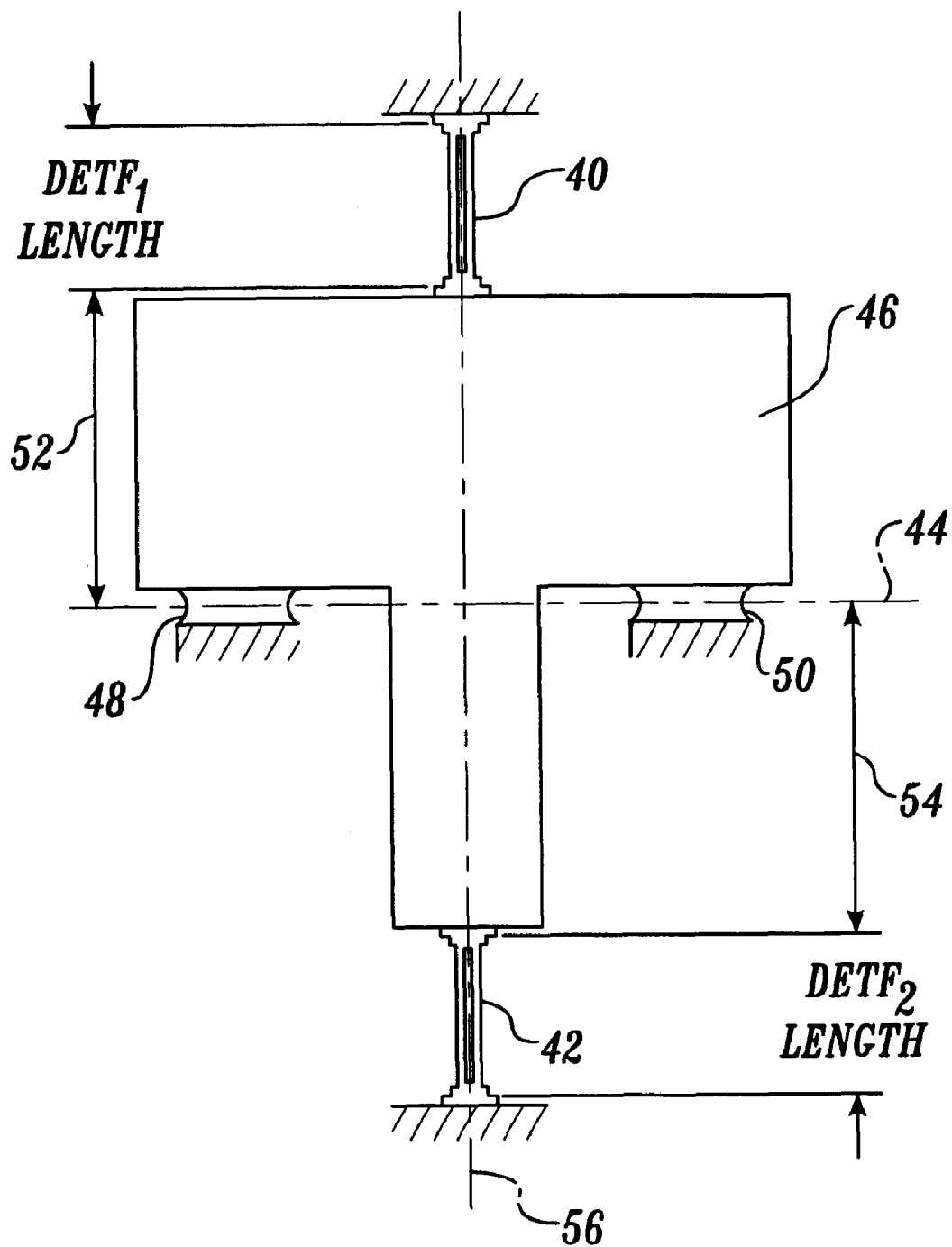
FIG. 3 is an illustration of DETF positioning according to an embodiment of the present invention.

FIG. 3 is an illustration of DETF 40, 42 positioning for a specific application according to one embodiment of the present invention which results in cancellation of the composite second-order non-linearity, $K_2$, term and in which individual DETFs 40, 42 are designed to have minimum second-order non-linearity, $K_2$, values. Those of skill in the art will recognize that the present invention may be practiced in various embodiments depending on the particular sensor design characteristics and the desired sensor performance.

In many practical applications the two DETFs are designed to differ in physical form to maximize performance-including, for example, avoiding undesirable interactions between the two DETFs when the frequency outputs of the two DETFs cross during transition from positive to negative input. The cancellation of second-order effects can also be accomplished for DETFs that differ in form. The cancellation requires positioning the ends at different, but definite, distances from the sensor hinge axis. Each DETF is located at a distance which is a definite multiple of the length of that DETF. FIG. 3 shows a configuration for the case where first DETF 40 and second DETF 42 differ in size and shape and are positioned on opposite sides of the hinge axis 44, where hinge axis 44 is defined by the center of rotation of flexures 46, 48. According to the present invention, positioning of DETFs 40, 42 such that the numerator, $(a_2-b_2)$, of the second-order non-linearity term, $$\frac{(a_2 - b_2)}{(a_1 + b_1)},$$

is zero, or approximately zero, is accomplished by having the moving end of first DETF 40 positioned at a first distance 52 from hinge axis 44 and the moving end of second DETF 42 positioned at a second distance 54 from hinge axis 44. For example, the particular application described in FIG. 3, DETFs 40, 42 are 1864 microns and 1851 microns in length, respectively, formed in a wafer having a standard thickness of 525 microns. The positioning of DETFs 40, 42 according to the present invention which results in substantially complete cancellation of the composite second-order non-linearity, $K_2$, terms is accomplished by positioning first DETF 40 at a distance 52 equal to 2.44 times the length of DETF 40 from hinge axis 44 and positioning second DETF 42 at a distance 54 equal to 2.61 times the length of DETF 42 from hinge axis 44. In other words, in FIG. 3, distance 52 is equal to 2.44 times the length of first DETF 40 and distance 54 is equal to 2.61 times the length of second DETF 42. Positioning DETFs 40, 42 within hinges 48, 50 and close to the centerline 56 of proof mass 46 maintains good common mode characteristics as discussed in reference to the embodiment of FIG. 2, above. Also as discussed in reference to FIG. 2, above, according to the embodiment shown in FIG. 3, side loading is minimized and good bandwidth is maintained.

The embodiment of FIG. 3 may utilize DETFs according to co-pending U.S. patent application Ser. No. 08/651,927 filed May 21, 1996, incorporated herein by reference, which is similarly assigned to the assignee of the present patent application. Optionally, the DETFs may be constructed using any of the designs known to those of skill in the art.

Additional embodiments of the present invention in the form of FIG. 3 are detailed in Table 2 including positioning of the two DETFs relative to hinge axis 44 at distances 52, 54 which are multiples of the individual lengths of each DETF 40, 42, and the degree of cancellation or composite second-order non-linearity term, $K_2$, in hertz. The additional embodiments of FIG. 3 described in Table 2 may also utilize DETFs according to co-pending U.S. patent application Ser. No. 08/651,927 filed May 21, 1996.

TABLE 2

| FIG. 3 Embodiments | Distance 52 (multiple of $DETF_1$ length) | Distance 54 (multiple of $DETF_2$ length) | Composite $K_2$ (Hz) |
| --- | --- | --- | --- |
| 1 (shown) | 2.44 | 2.61 | 0 |
| 2 | 1.55 | 1.91 | 0 |
| 3 | 2.00 | 2.00 | −70 |
| 4 | 2.56 | 2.56 | −5 |
| 5 | 3.00 | 3.00 | −4 |

Figure 4:
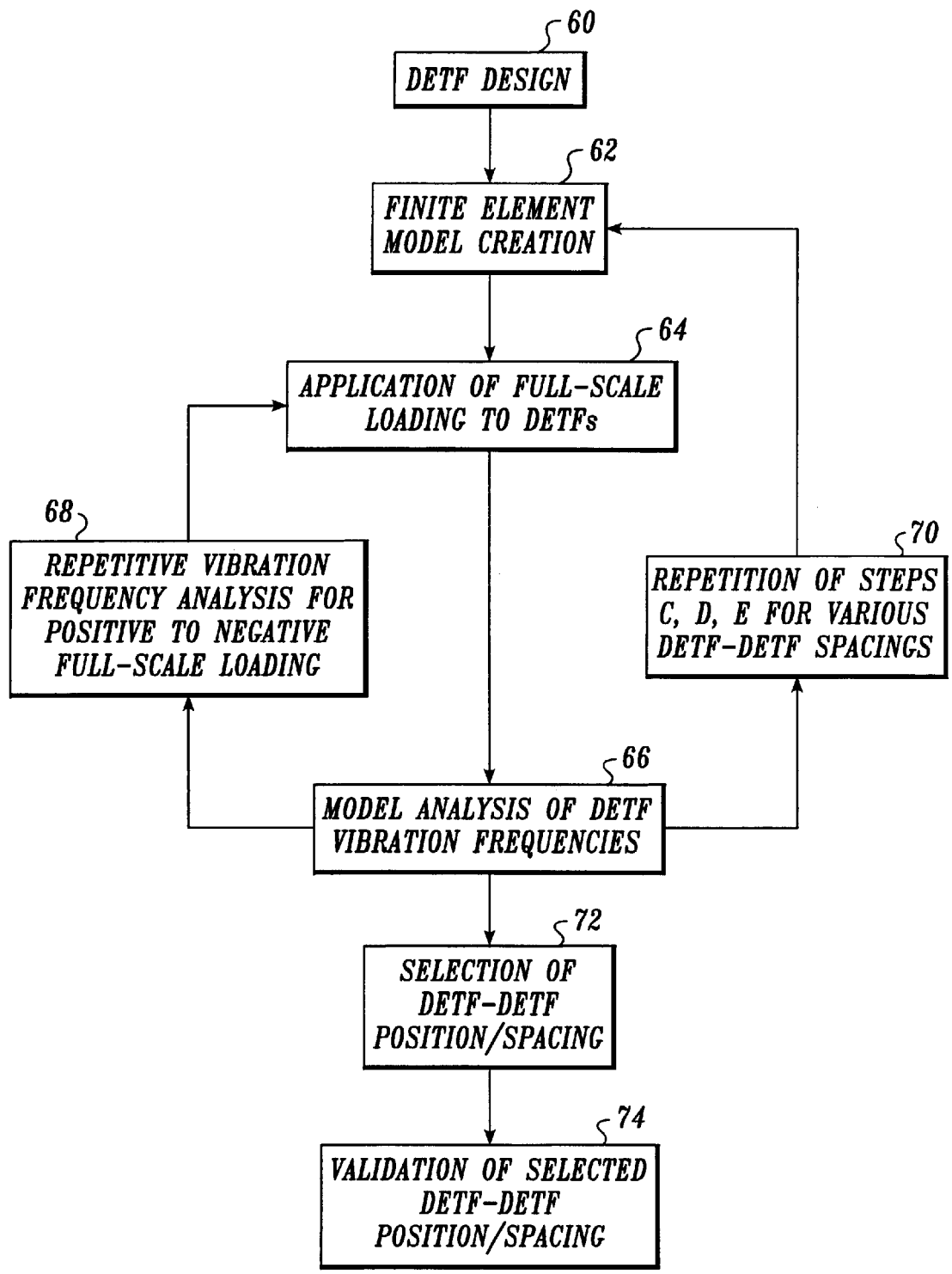
FIG. 4 is a flow chart representation describing the iterative method according to one embodiment of the present invention.

FIG. 4 is a flow chart representation describing the iterative method used to achieve the physical embodiments shown in FIGS. 2 and 3. One method for implementing the present invention is through the sequence of calculations outlined below, which are greatly simplified by the fact that none of the finite element model changes made in the course of the calculations cause a significant change in the accelerometer scale factor, where scale factor, $K_1$, is the sensor's sensitivity to input force or acceleration. According to one embodiment of the present invention, the accelerometer of the present invention may, for example, be designed as follows:

First Step 60: DETF Design.

Design DETFs 20, 22 using classical formulae or finite element methods to give the desired nominal no-load frequencies and scale factors. Scale factor may be either frequency change per unit load or frequency change per unit extension. Use the well-known design rules, for example, those found in Lawrence's *Modern Inertial Technology: Navigation, Guidance and Control*, to ensure that DETFs 20, 22 possess equal, or very nearly equal, second-order non-linearities, using the desired unit of measure, for example, micro $g/g^2$, milli $g/g^2$, or hertz. According to one embodiment of the present invention, DETFs 20, 22 are designed using classical formulae or finite element methods to have second order non-linearities which are either a minimum or zero. Classical formulae for designing DETFs to give the desired nominal no-load frequencies and scale factors are described in, for example, U.S. Pat. No. 4,372,173, which is incorporated herein by reference. The finite element models may be created using, for example, ANSYS, NASTRAN, COSMOS, or other finite element modeling programs capable of Eigenvalue extraction.

Second Step 62: Finite Element Model Creation.

Create a finite-element model comprising, as a minimum, DETFs 20, 22 and sensor hinges 28, 30 connected together at one end by a very stiff structure, preferably a massless structure, representing the proof mass. The DETF length is typically on the order of 1,500 microns. Hinges 28, 30 are preferably on the order of 100 to 200 microns in length, and are preferably as thick as possible without seriously degrading sensor performance. Design factors beyond the scope of this specification may enter in the selection of hinge 28, 30 dimensions. Generally, the ratio of DETF length to hinge length is preferably as large as practical, for example, the ratio of DETF length to hinge length is preferably in a range from 8:1 to 20:1 or more. The other ends of the DETFs are fixed or solidly connected to an immobile structure. The distance from the plane defined by DETFs 20, 22 to hinge axis 24 should be the same as that intended for use in the actual accelerometer. In a typical silicon sensor, this distance is a fixed fraction of the wafer thickness. Typically, the hinge is formed at the centerline of the substrate such that the distance from the plane defined by the DETFs to the hinge axis is one half the thickness of the substrate.

Third Step 64: Application of Full-scale Loading.

Within the finite element model, apply model-forces to the connecting structure to cause it to rotate to the degree the actual proof mass 26 would be expected to turn for a full-scale input. In addition, apply full-scale acceleration loadings directly to DETFs 20, 22, so that the finite element model results will include the effects of DETF 20, 22 deformations due to the side loading that will be present in an actual accelerometer. Attainment of a full-scale displacement can be deduced from the frequency changes in DETFs 20, 22 compared to their unloaded values.

Fourth Step 66: Model Analysis.

Use the non-linear analysis capabilities of the finite element analysis program to find the vibration frequencies of DETFs 20, 22 in a deformed, pre-stressed state. Record the frequencies.

Fifth Step 68: Repetitive Vibration Frequency Analysis.

Repeat vibration frequency analysis of fourth step 66 to find the frequencies of DETFs 20, 22 for at least four more loads between negative full-scale and positive full-scale. Use curve-fitting techniques known to those of skill in the art to find the non-linearities in the difference frequency.

Sixth Step 70: Repetitive Finite Element Analysis.

Create finite-element models for various DETF-to-DETF spacings between DETFs 20, 22. Repeat loading and vibration frequency analysis of third step 64 through fifth step 68 for various DETF-to-DETF spacings between DETFs 20, 22 to create a model of second-order non-linearity as a function of DETF-to-DETF spacing.

Seventh Step 72: DETF-to-DETF Positioning/Spacing Selection.

Select the positions of DETFs 20, 22, or the spacing between DETFs 20, 22 where the composite second-order non-linearity is either a minimum or zero. In other words, select the positions of DETFs 20, 22, or the spacing between DETFs 20, 22 where the respective second-order non-linearity values of DETFs 20, 22 cancel.

Eighth Step 74: Validation of selected DETF-to-DETF Positioning/Spacing Selection.

Create a complete design embodying the DETF-to-DETF positioning or spacing selected in seventh step 72, being certain that the center of mass of the proof mass is located appropriately to produce the rotations at full-scale that were assumed in defining DETF 20, 22 positions.

Those of skill in the art will realize that the optimal design from the standpoint of $K_2$ cancellation may not be the best from other standpoints. In particular, implementation of $K_2$ cancellation may require a larger piece of silicon to manufacture. Those of skill in the art will realize that selection of the best DETF positions for the overall accelerometer should consider all pertinent factors, not just $K_2$. Pertinent factors may include, for example, the desired scale factor, third-order affects, and other performance goals of the sensor or accelerometer.

Figure 5:
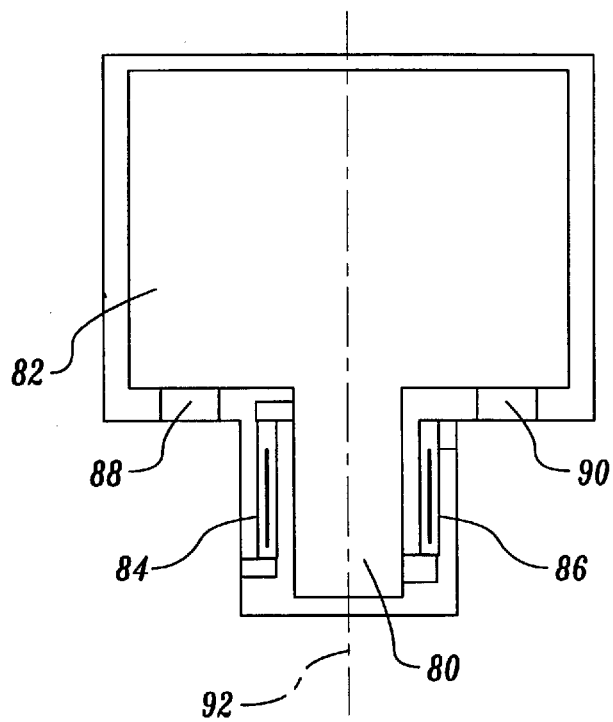
FIG. 5 is a plan view of a double-ended tuning fork device according to an embodiment of the present invention.

Another embodiment of the present invention is shown in FIG. 5. The embodiment of FIG. 5 includes a projection 80 on the proof mass 82 which allows positioning the DETFs 84, 86 within the hinges 88, 90 and close to the centerline 92 of proof mass 82 between hinges 88, 90. As noted in the discussion of FIG. 2, above, positioning DETFs 84, 86 away from centerline 92 between hinges 88, 90 may reduce common mode tracking performance. However, according to the embodiment of the invention depicted in FIG. 5, DETFs 84, 86 are moved close to centerline 92 which limits the effects of geometry on common mode tracking performance. DETFs 84, 86 may be positioned as close to centerline 92 as processing techniques allow, but DETFs 84, 86 are preferably separated by a minimum distance such that cross-coupling is avoided. In one example, DETFs 84, 86 are separated by 800 microns.

Figure 6:
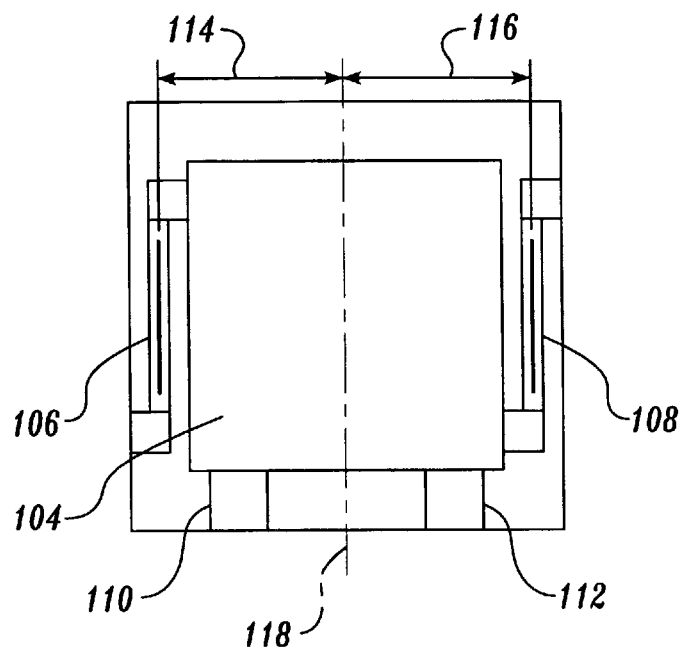
FIG. 6. is a plan view of a double-ended tuning fork device according to an embodiment of the present invention.

Another embodiment of the present invention is shown in FIG. 6. The embodiment of FIG. 6 includes projections 100, 102 on the sides of proof mass 104 which allows positioning the DETFs 106, 108 on either side of proof mass 104 and outside hinges 110, 112 at distances 114, 116 from centerline 118. As noted in the discussion of FIG. 2, above, positioning DETFs 106, 108 away from centerline 118 may reduce common mode tracking performance. However, according to the embodiment of the invention depicted in FIG. 6, the relatively greater cross-axis stiffness of hinges 110, 112 compared to the negligible stiffness of DETFs 106, 108 limits the effects of geometry on common mode tracking performance. In a practical accelerometer, cross-axis stiffness of hinges 110, 112 may be 100 or more times greater than the stiffness of DETFs 106, 108. Further, the embodiment of FIG. 6 provides the minimum sensor area for a desired sensor response or scale factor which increases the number of mechanisms that can be fabricated per silicon wafer, thus, lowering unit cost. According to one particular embodiment of the present invention according to FIG. 6, DETFs 106, 108 are 1804 microns and 1800 microns in length, respectively, formed in a 525 micron thick wafer. The moving end of DETF 106 is positioned at 1.47 times the length of DETF 106 from the hinge axis 119 formed at the center of rotation of hinges 110, 112 and the moving end of DETF 108 is positioned at 0.32 times the length of DETF 108 from hinge axis 119.

Figure 7:
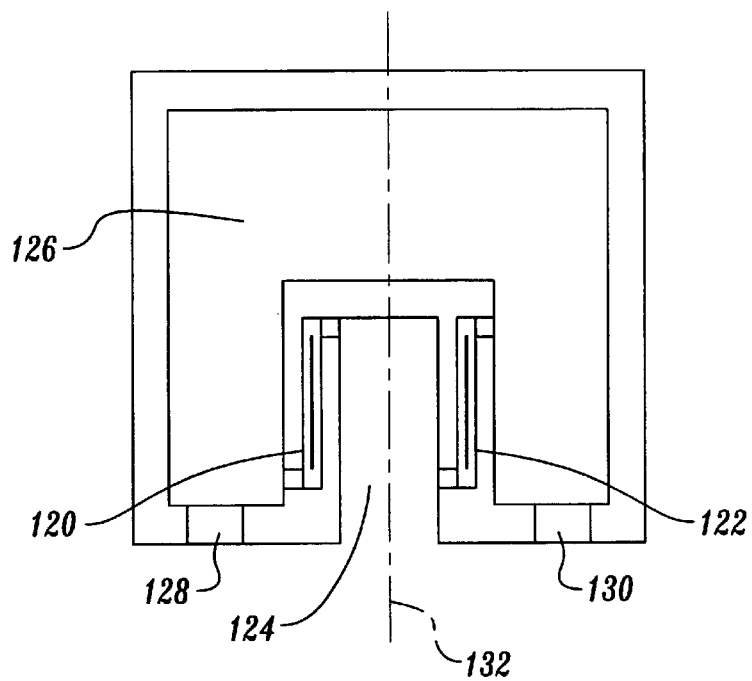
FIG. 7 is another plan view of a double-ended tuning fork device according to an embodiment of the present invention.

Another embodiment of the present invention is shown in FIG. 7. The embodiment of FIG. 7 eliminates the projection on the proof mass by mounting the DETFs 120, 122 to a frame projection 124 within the proof mass 126 structure. The embodiment of FIG. 7 includes a new configuration for proof mass 126. The embodiment of FIG. 7 maximizes pendulosity for proof mass size, minimizes hinge side loading which may reduce common mode tracking performance and allows maximum separation between flexure hinges. Pendulosity of the proof mass is maximized by positioning DETFs 120, 122 within the hinges 128, 130 and close to the centerline 132 of proof mass 126 to maintain good common mode performance. Thus, side loading is reduced and good bandwidth as defined above is maintained. Unit size and cost are kept to a minimum while performance is improved. By eliminating projection 80 and thus reducing the overall area of the mechanism, the embodiment of FIG. 7 also increases the number of mechanisms that can be fabricated per silicon wafer, thus, lowering unit cost.

The tines of DETFs are formed in the silicon wafer by an etching process well known to those of skill in the art. The tines of DETFs are typically formed in the silicon wafer by masking the wafer with a mask having the desired tine shape and coating the exposed areas of the wafer with a substance which is impervious to silicon-etching chemicals. The mask is removed and the wafer is exposed to a silicon-etching chemical whereby the wafer material around the DETF tines is dissolved thus forming the tines in the silicon wafer. The wafer may be repeatedly exposed to the masking and etching process using different shaped masks designed to progressively reveal a tine having the desired shape and the desired degree of detail.

Figure 8:
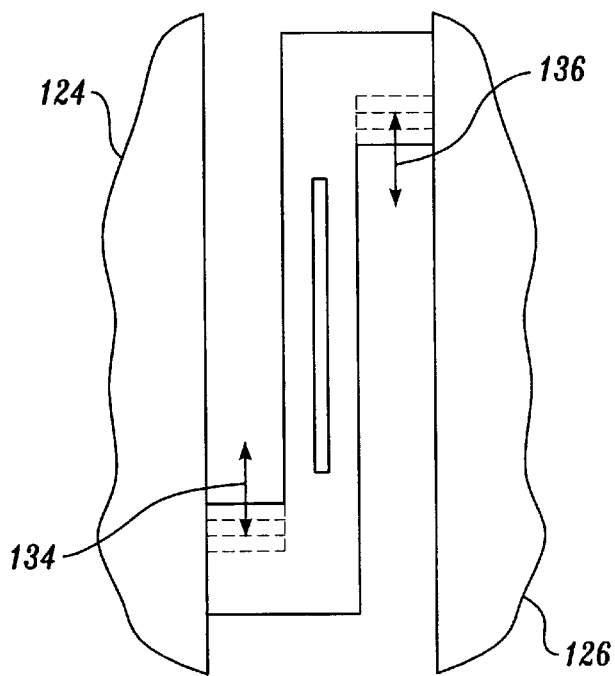
FIG. 8 is a detailed plan view of a double-ended tuning fork device according to an embodiment of the present invention.

FIG. 8 is a detailed plan view of a double-ended tuning fork device according to an embodiment of the present invention. The structure of FIG. 7 including DETFs 120, 122 is formed in part using silicon etching techniques known to those of skill in the art and described, for example, in U.S. Pat. Nos. 4,597,003 and 4,783,237, both incorporated herein by reference. FIG. 8 shows an enlarged view of DETF 120. The effective interface points between DETF 120 and proof mass 126 and between DETF 120 and projection 124 are the effective end points of the DETF tines. Possible adjustments of the interface to both proof mass 126 and frame projection 124 are indicated in FIG. 8 by dotted lines. A single repetition of the masking and etching process can relocate the effective interface point as indicated by arrows 134, 136. Relocation of the effective interface point is a simple cost effective approach for tuning both individual DETFs 120, 122 second-order non-linearity, $K_2$, terms and the composite second-order non-linearity , $K_2$, term. This adjustment or tuning technique used in conjunction with any of the various embodiments described herein provides additional cost effective and schedule effective performance optimization of vibrating beam force sensors and accelerometers using only one mask for the relocation of the effective interface point.

Preferred embodiments of the invention have been described. Variations and modifications will be readily apparent to those of skill in the art. For this reason the invention is to be interpreted in light of the claims.

What is claimed is:

1. A double-ended tuning fork (DETF) sensor, comprising:

a first and a second DETF, each of said DETFs having a first end and a second end;

a proof mass;

a support frame;

at least one hinge rotatably connecting said proof mass to said support frame;

said first ends of said DETFs spaced apart and connected to said proof mass and said second ends of said DETFs connected directly to said support frame; and wherein said first DETF and said second DETF are constructed and positioned between said proof mass and said support frame such that a first second-order non-linearity term associated with said first DETF and a second second-order non-linearity term associated with said second DETF are substantially equal in magnitude.

2. The DETF sensor as recited in claim 1, wherein the ratio of the length of said DETFs to the length of said hinge is a minimum of 8:1.

3. The DETF sensor as recited in claim 1, wherein said first and second DETFs have essentially identical size and essentially identical shape.

4. The DETF sensor as recited in claim 1, wherein a rotation center of said hinge defines a hinge axis.

5. A double-ended tuning fork (DETF) sensor, comprising;

a first and a second DETF, each of said DFTFs having a first end and a second end;

a proof mass;

a support frame;

at least one hinge rotatably connecting said proof mass to said support frame;

said first ends of said DETFs spaced apart and connected to said proof mass and said second ends of said DETFs connected to said support frame; and wherein said first DETF and said second DETF are constructed such that a first second-order non-linearity term associated with said first DETF and a second second-order non-linearity term associated with said second DETF are substantially equal in magnitude wherein a rotation center of said hinge defines a hinge axis, and wherein said first ends of said DETFs are spaced substantially equidistantly from said hinge axis.

6. The DETF sensor as recited in claim 5, wherein said first and second DETFs are located on opposing sides of said hinge axis.

7. The DETF sensor as recited in claim 6, wherein a line perpendicular to said hinge axis and passing through the center of mass of said proof mass defines a centerline of said proof mass, and a longitudinal axis of said first and second DETEs are located substantially coincident with said centerline.

8. The DETF sensor as recited in claim 7, wherein said first DETF is located at a first distance from said hinge axis and said second DETF is located at a second distance from said hinge axis.

9. The DETF sensor as recited in claim 8, wherein said first distance is a predetermined multiple of the length of said first DETF and said second distance is a predetermined multiple of the length of said second DETF.

10. The DETF sensor as recited in claim 4, wherein said first and second DETFs are located on the same side of said hinge axis.

11. The DETF sensor as recited in claim 4, wherein said proof mass is positioned on a first side of said hinge axis and includes a projection on a second side of said hinge axis, and said first and second DETFs are positioned on said second side of said hinge axis parallel to said proof mass projection.

12. The DETF sensor as recited in claim 5, wherein said proof mass is positioned on a first side of said hinge axis and is formed with a relief having an interior surface, said relief located adjacent said hinge, said support frame includes a projection having an exterior surface, said projection located adjacent said hinge and projecting into said relief, said first ends of said DETFs are connected to said interior surface of said relief, and said second ends of said DETFs are connected to said exterior surface of said projection.

13. The DETF sensor as recited in claim 1, wherein
   said support frame is formed with a relief having an interior surface;
   said proof mass comprises a plate having an exterior surface, said plate projecting into said relief;
   said first ends of first and second DETFs are fixed to said interior surface of said relief; and
   said second ends of said DETFs are fixed to said exterior surface of said plate.

14. A double-ended tuning fork (DETF) sensor, comprising:
   a first and a second DETF, each of said DETFs having a first end and a second end;
   a proof mass;
   a support frame;
   at least one hinge rotatably connecting said proof mass to said support frame; said hinge having a rotation center defining a hinge axis having a first side and a second side,
   said proof mass positioned on said first side of said hinge axis and formed with a relief having two essentially parallel and spaced apart interior surfaces, said relief located adjacent said hinge,
   said support frame including a projection having two essentially parallel exterior surfaces coincident with and spaced apart from said interior surfaces of said relief,
   said hinge comprising a first and a second flexure, said flexures flanking said projection,
   said first end of said first DETF connected to a first interior surface of said relief and said second end of said first DETF connected to a first of said exterior surface of said projection;
   said first end of said second DETF connected to a second interior surface of said relief and said second end of said second DETF connected to a second of said exterior surface of said projection;
   whereby a deflection of said proof mass puts one of said first or second DETFs in compression and puts the other of said DETFs in tension; and
   wherein said first DETF and said second DETF are constructed such that a first second-order non-linearity term associated with said first DETF and a second second-order non-linearity term associated with said second DETF are substantially equal in magnitude.

15. The DETF sensor as recited in claim 14, wherein said first second-order non-linearity term is a minimum, and said second-order non-linearity term is a minimum.

16. The DETF sensor as recited in claim 14, wherein said first and second second-order non-linearity terms are substantially equal.

17. A double-ended tuning fork (DETF) sensor, comprising:
   a first and a second DETF, each of said DETFs having a first end and a second end;
   a proof mass;
   a support frame;
   at least one hinge rotatably connecting said proof mass to said support frame, said hinge having a center of rotation defining a hinge axis;
   said first end of said first DETF positioned on a first side of said hinge axis and spaced away from said hinge axis by a first predetermined distance;
   said first end of said second DETF positioned on a second side of said hinge axis and spaced away from said hinge axis by a second predetermined distance;
   a first second-order non-linearity term associated with said first DETF; and
   a second second-order non-linearity term associated with said second DETF which is substantially equal to said first second-order non-linearity term.

18. The DETF sensor as recited in claim 17, wherein the values of said first and said second second-order non-linearity terms are a minimum.

* * * * *